（12）United States Patent
Lin (10) Patent No.: US 8,863,613 B2
(45) Date of Patent: Oct. 21, 2014

(54) CONTROL MODULE MOUNTED ON HANDLEBAR OF BICYCLE

(75) Inventor: Yu-Hsin Lin, Taichung (TW)

(73) Assignee: Lee Chi Enterprises Company Ltd., Changhua County (TW)

( * ) Notice: Subject to any disclaimer, the term of this patent is extended or adjusted under 35 U.S.C. 154(b) by 0 days.

(21) Appl. No.: 13/569,421

(22) Filed: Aug. 8, 2012

(65) Prior Publication Data

US 2013/0036859 A1    Feb. 14, 2013

(30) Foreign Application Priority Data

Aug. 12, 2011   (TW) .............................. 100215081 U (51) Int. Cl.
*B62K 21/26* (2006.01)
*B62K 23/06* (2006.01)
*B60T 11/04* (2006.01)
*B60T 7/10* (2006.01)

(52) U.S. Cl.
CPC ................. *B62K 23/06* (2013.01); *B62K 21/26* (2013.01); *B60T 11/046* (2013.01); *B60T 7/102* (2013.01)
USPC .......................................................... 74/551.9

(58) Field of Classification Search
USPC .................. 74/502.2, 488, 489, 551.8, 551.9
See application file for complete search history.

(56) References Cited

U.S. PATENT DOCUMENTS

| | | | |
|---|---|---|---|
| 6,263,759 B1 * | 7/2001 | Hollingsworth et al. ..... | 74/551.9 |
| 7,334,499 B2 * | 2/2008 | Lai ............................. | 74/551.9 |
| 2002/0035886 A1 * | 3/2002 | Ose ............................ | 74/502.2 |
| 2010/0263477 A1 * | 10/2010 | Ting ........................... | 74/551.9 |
| 2010/0275723 A1 * | 11/2010 | Servet ........................ | 74/551.1 |
| 2011/0083525 A1 * | 4/2011 | Hirose et al. ................ | 74/501.6 |

* cited by examiner

*Primary Examiner* — Thomas Diaz
(74) *Attorney, Agent, or Firm* — Ming Chow; Sinorica, LLC (57) ABSTRACT

A control module, which is mounted on a handlebar of a bicycle, includes a base, a grip, a control bar, and a bolt. The base has a hole, and the hole has a first section and a second section, wherein the second section is bigger than the first section. The base is fitted to the handlebar whereby a sidewall of the first section touches the handlebar. The grip is fitted to the handlebar, and has a portion received in the second section of the hole of the base. The control bar is provided on the base to control a brake module or a derailleur module. The bolt is provided on the base, wherein both the base and the grip are fixed to the handlebar at the same time by tightening the bolt.

2 Claims, 16 Drawing Sheets

CONTROL MODULE MOUNTED ON HANDLEBAR OF BICYCLE

BACKGROUND OF THE INVENTION

1. Field of the Invention

The present invention relates generally to a bicycle, and more particularly to a control module, which is mounted on a handlebar of a bicycle.

2. Description of the Related Art

Nowadays, bicycles are changed from a tool for transportation to a tool for sport. Cycling is not only good for health, but also achieves the purpose of energy conservation and carbon reduction.

A conventional bicycle is provided with a pair of grips to be mounted onto opposite ends of a handlebar. Riders hold the grips to control the bicycle. However, the grips may be loose after a long-term usage or a heavy duty off-road riding that may cause danger in cycling.

Figure 1:
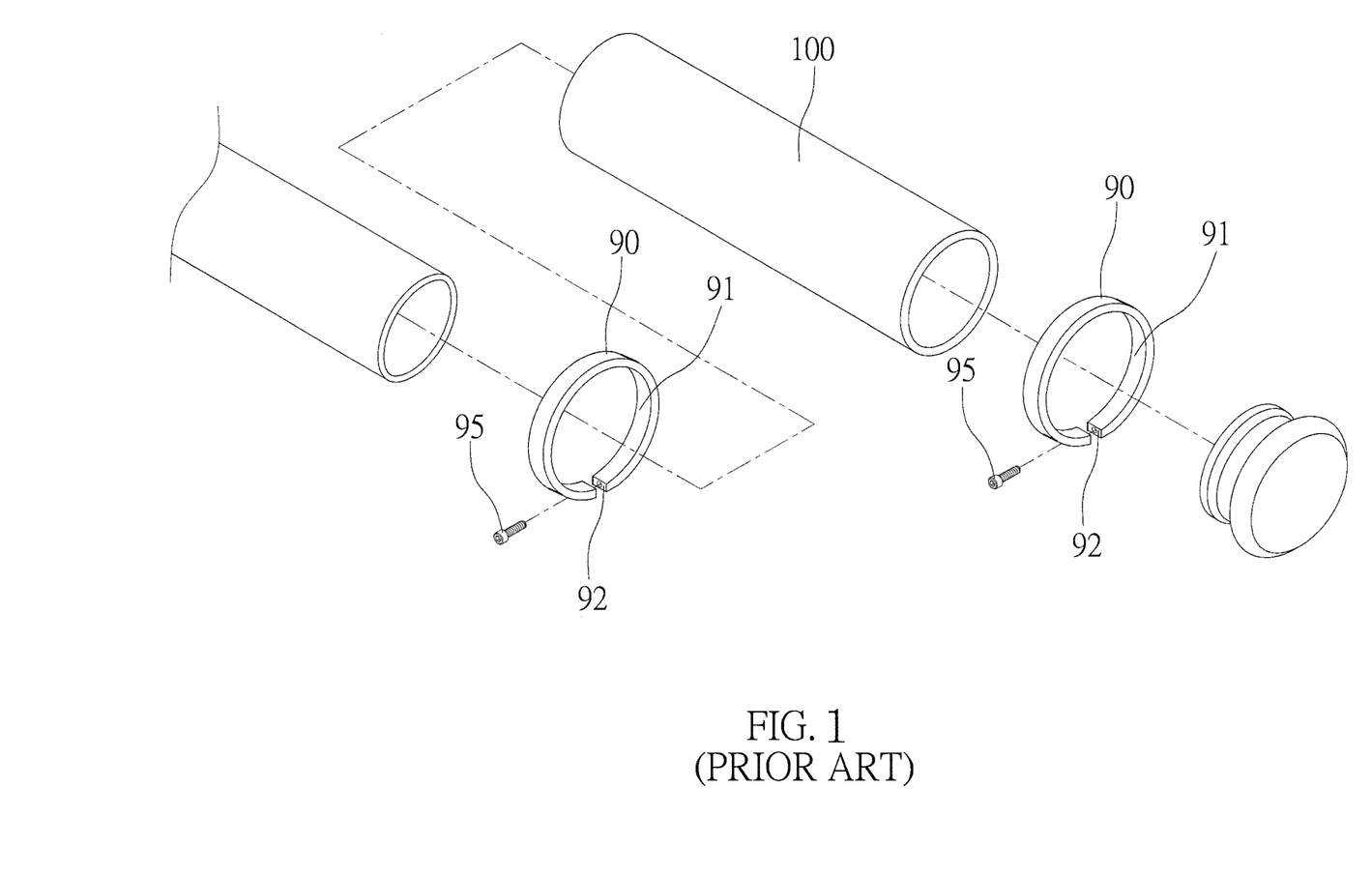
FIG. 1 is an exploded view of the conventional handlebar grip.
Figure 2:
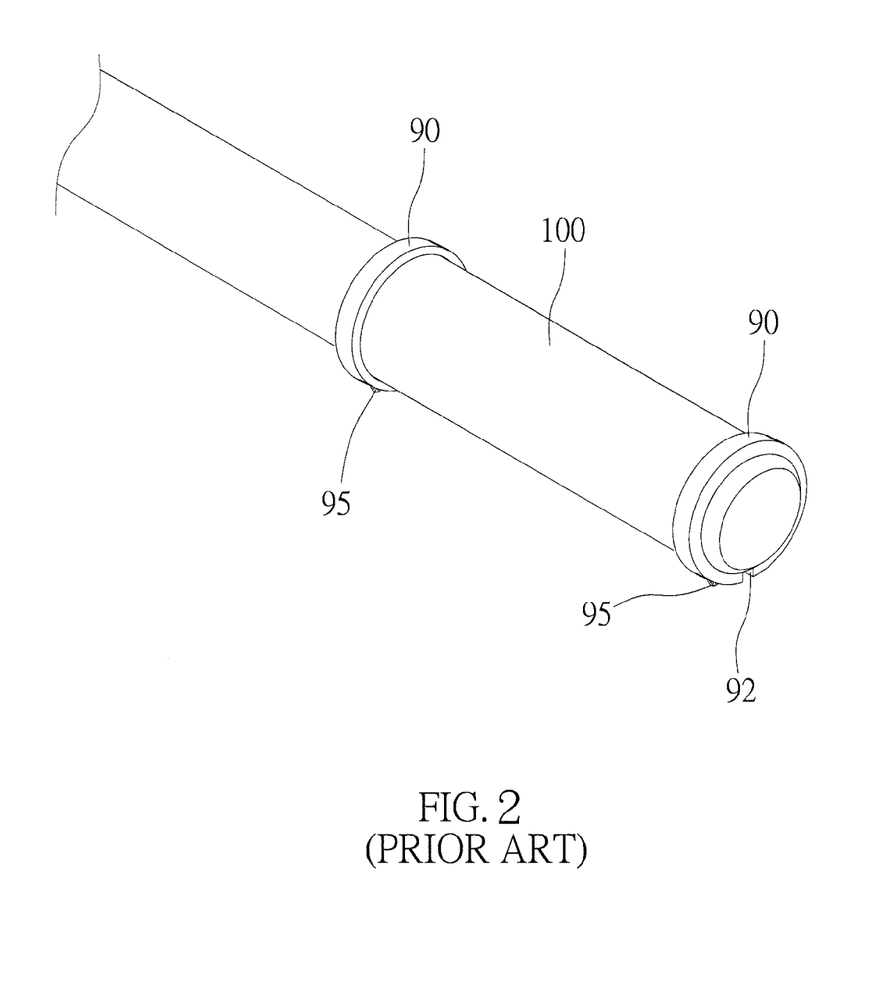
FIG. 2 is a perspective view of the conventional handlebar grip.

In order to overcome the loose problem, as shown in FIG. 1 and FIG. 2, an improved grip is provided in the market. The grip has a grip member 100 and two rings 90. The ring 90 has a hole 91 at a center and a gap 92. The rings 90 are fitted to opposite ends of the grip member 100, and are fastened by bolts 95 that may firmly fix the grip member 100 to the handlebar by tightening the bolt 95. However, the rings 90 and the bolts 95 are exposed so that rider may touch the rings 90 and the bolts 95 in cycling, and that may interfere with rider to operate the bicycle, and furthermore it may hurt rider's hands. In conclusion, there are still some shortness for the conventional handlebar to be improved.

SUMMARY OF THE INVENTION

The primary objective of the present invention is to provide a control module, which is mounted on a handlebar of a bicycle. The control module will not interfere with the operation of the bicycle.

According to the objective of the present invention, the present invention provides a control module, which is mounted on a handlebar of a bicycle including a base, a grip, at least a control bar, and at least a bolt. The base has a hole, and the hole has a first section and a second section, wherein the second section is bigger than the first section. The base is fitted to the handlebar whereby a sidewall of the first section touches the handlebar. The grip is fitted to the handlebar, and has a portion received in the second section of the hole of the base. The bolt is provided on the base, wherein both the base and the grip are fixed to the handlebar at the same time by tightening the bolt.

In an embodiment, the grip has at least a protrusion at an end thereof; and the protrusion is received in the second section of the hole of the base.

In an embodiment, the grip has an opening at an end thereof and a flange surrounding the opening; and the flange is against the base.

In an embodiment, the base has a body and a pressing member; and the pressing member is fixed to the body by the bolt to form the hole therebetween.

In an embodiment, the pressing member has an end pivoted on the base; and the gap is formed between a free end and the base.

In an embodiment, the pressing member has two bores whereby two of the bolts respectively are inserted into the bores of the pressing to fix the pressing member to the base.

Therefore, the grip is firmly fixed to the handlebar to provide the rider an easy and safe way to operate the bicycle.

DETAILED DESCRIPTION OF THE INVENTION

The detailed description and technical contents of the present invention will be explained with reference to the accompanying drawings. However, the drawings are illustrative only but not used to limit the present invention.

Figure 3:
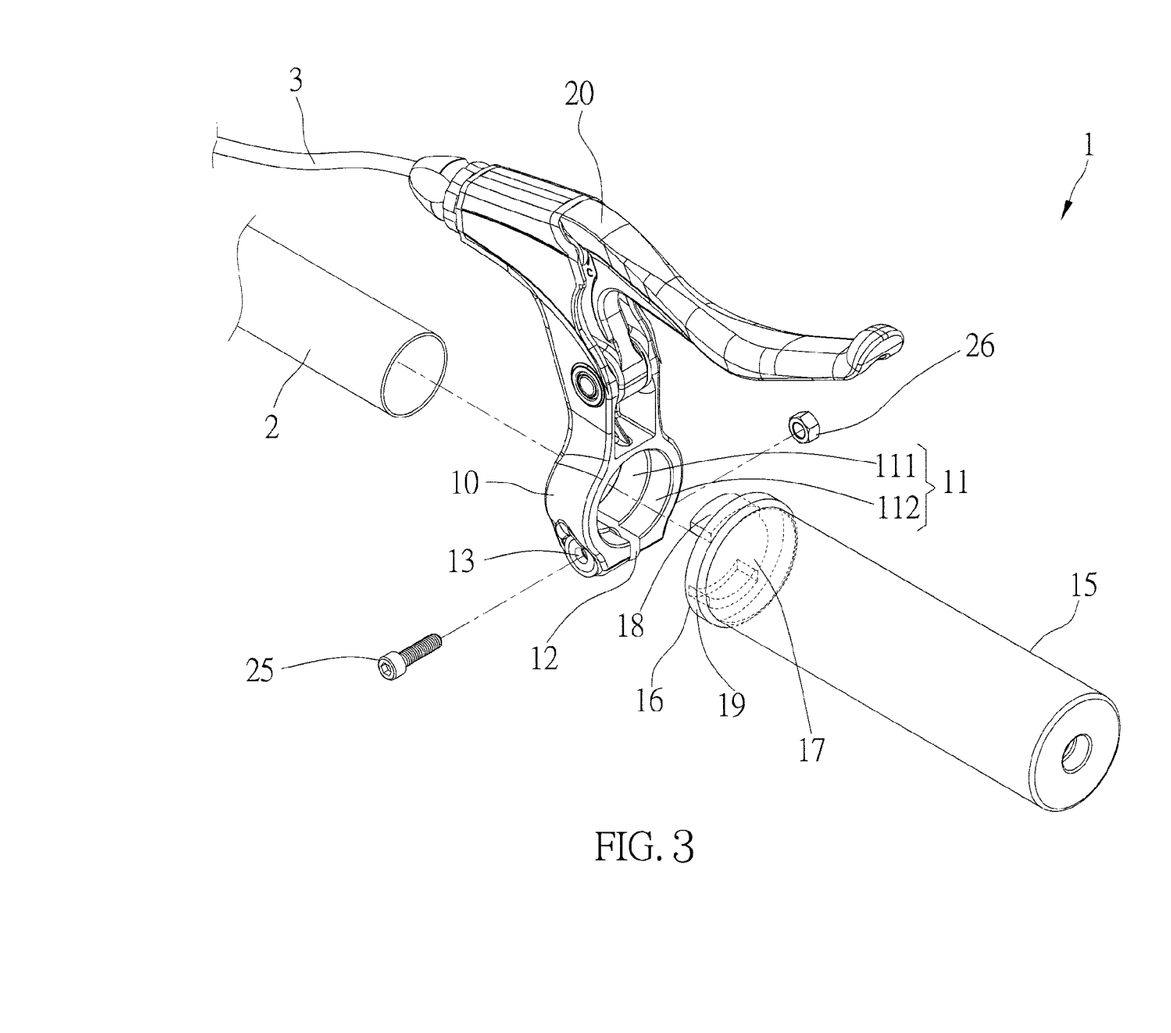
FIG. 3 is an exploded view of a first preferred embodiment of the present invention.
Figure 4:
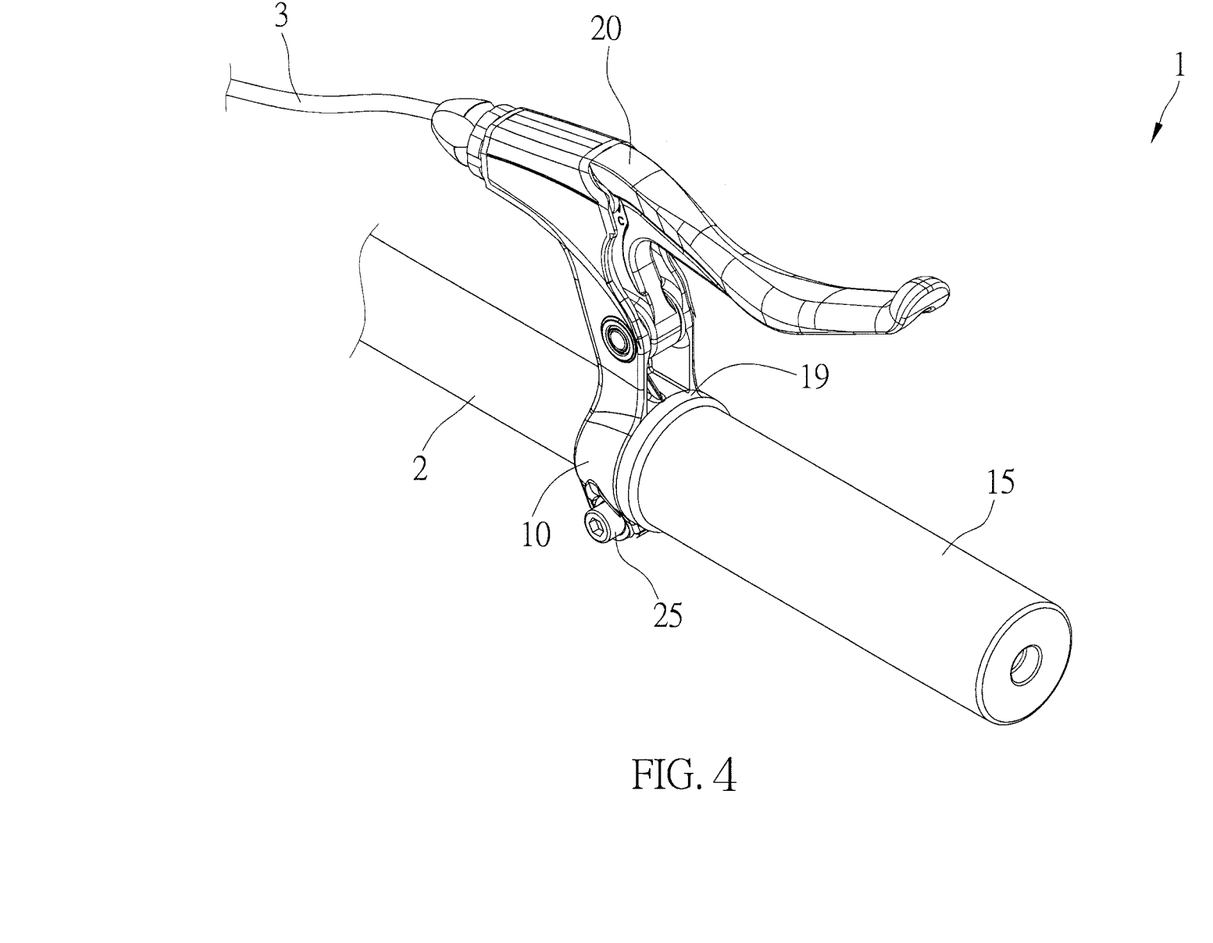
FIG. 4 is a perspective view of the first preferred embodiment of the present invention.

As shown in FIG. 3 and FIG. 4, a control module 1 of the first preferred embodiment of the present invention is mounted on a handlebar 2 of a bicycle. The control module 1 is connected to a brake module (not shown) through a wire 3. The control module 1 includes a base 10, a grip 15, a control bar 20, and a bolt 25.

The base 10 has a hole 11, a gap 12 communicated with the hole 11, and two bores 13 at opposite sides of the gap 12. The hole 11 has a first section 111 and a second section 112. The second section 112 is bigger than the first section 111. The base 10 is fitted to the handlebar 2 and a sidewall of the first section 111 touches the handlebar 2.

The grip 15 is fitted to the handlebar 2. The grip 15 has an opening 17 at an end 16 proximal to the base 10, and two protrusions 18 at opposite sides of the opening 17. The protrusions 18 are projected from the end 16 of the grip 17 and received in the second section 112 of the hole 11 of the base 10. The grip 15 further has a flange 19 surrounding the opening 17 to be against the base 10.

The control bar 20 is pivoted on the base 10 to be operated by rider to control the brake module through the wire 3.

Figure 5:
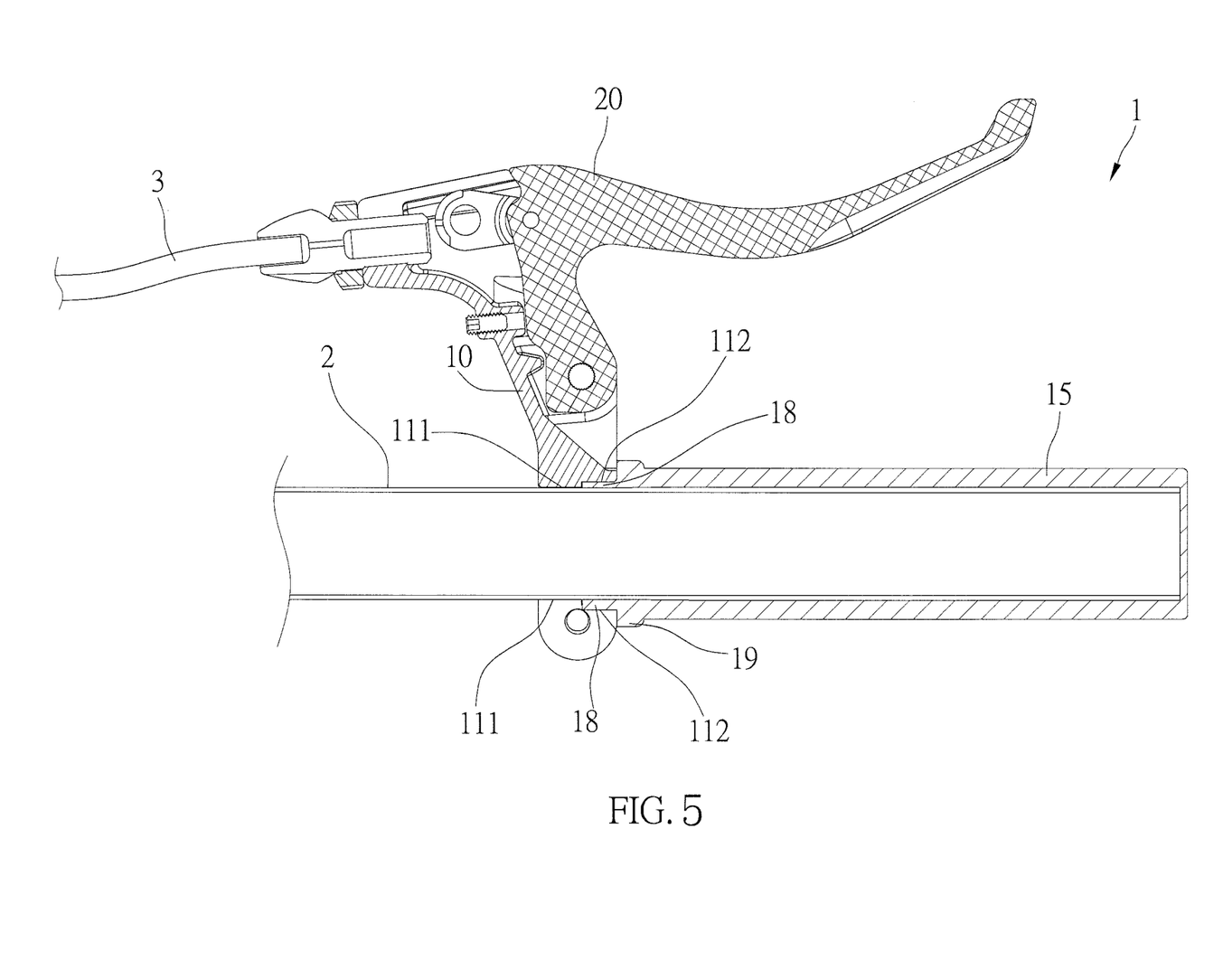
FIG. 5 is a sectional view of the first preferred embodiment of the present invention.

The bolt 25 is inserted into the bores 13 of the base 10 to engage a nut 26. As shown in FIG. 5, both the base 10 and the grip 15 are fitted to the handlebar 2, and the protrusions 18 are received in the second section 112 of the hole 11 of the base 10 and the flange 19 touches the base 10. The base 10 and the grip 15 are fixed to the handlebar 2 at the same time by tightening the bolt 25.

Figure 6:
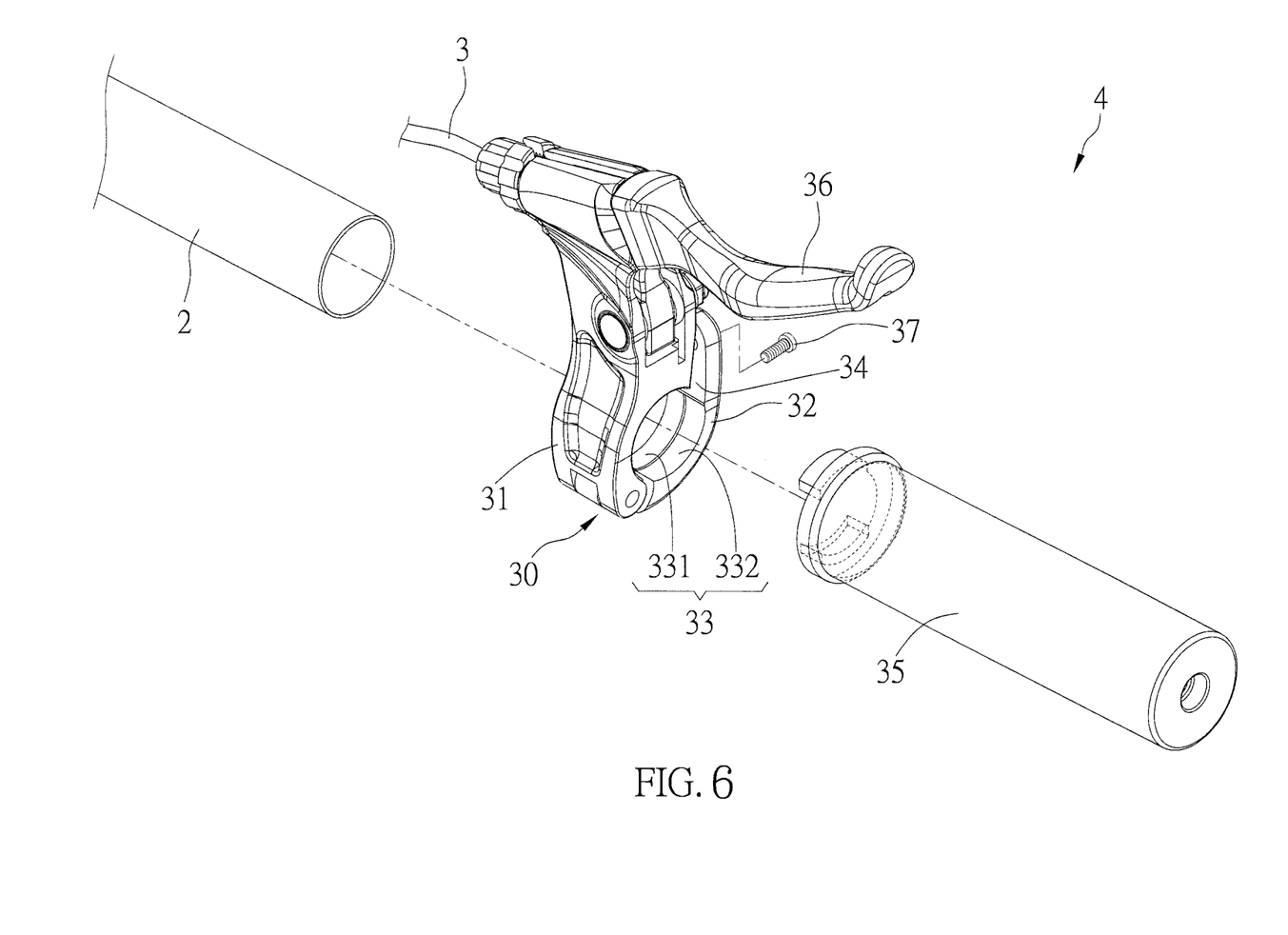
FIG. 6 is an exploded view of a second preferred embodiment of the present invention.
Figure 7:
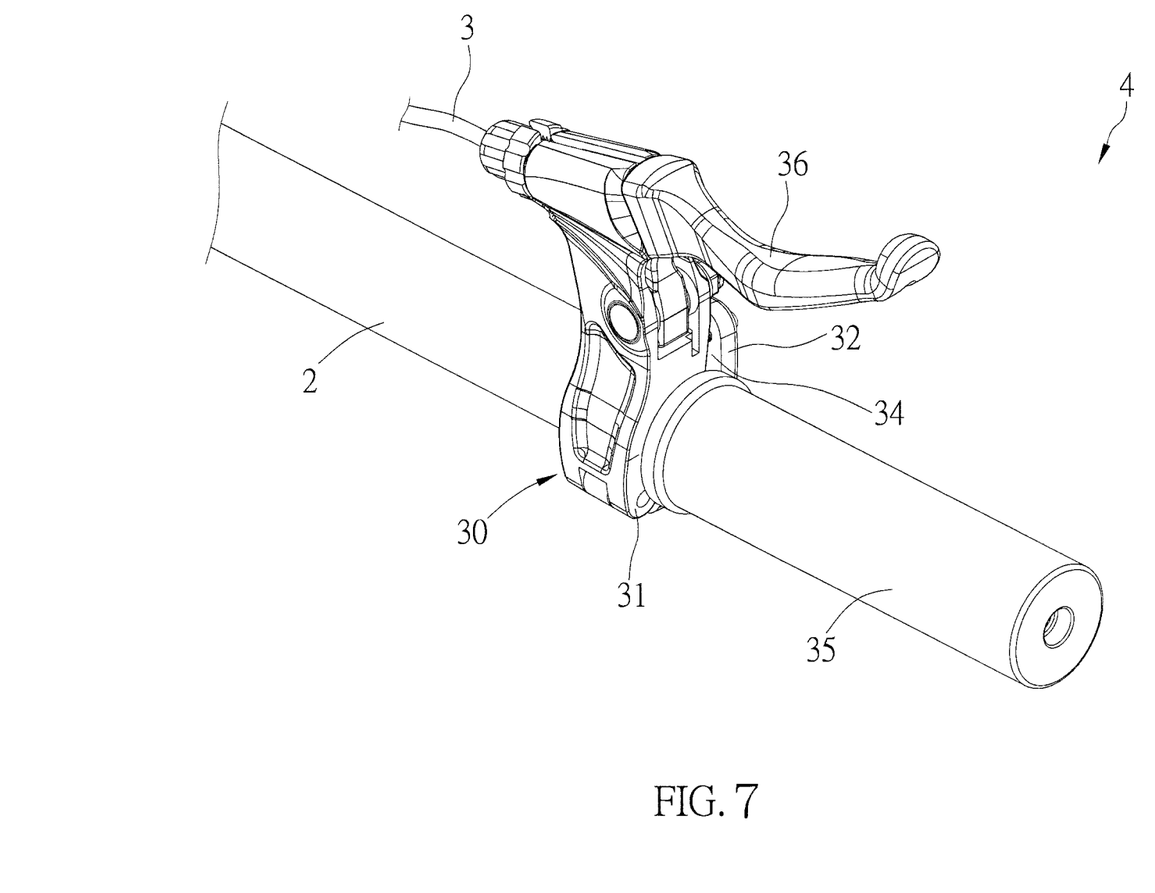
FIG. 7 is a perspective view of the second preferred embodiment of the present invention.

FIG. 6 and FIG. 7 show a control module 4 of the second preferred embodiment of the present invention, which is mounted on the handlebar 2 to control the brake module through the wire 3. The control module 4 has a base 30, a grip 35, a control bar 36, and a bolt 37 wherein the grip 35, the control bar 36, and the bolt 37 are the same as above.

The base 30 has a body 31 and a pressing member 32. The pressing member 32 has an end pivoted on the body 31 so that a hole 33 is formed between the body 31 and the pressing member 32, and a gap 34 is formed between a free end of the pressing member 32 and the body 31. The hole 33, the same as above, has a first second 331 and a second section 332. The second section 332 is bigger than the first second 331. The handlebar 2 engages the first section 331 of the base 30. The bolt 37 is inserted into bores at opposite sides of the gap 34 to engage a nut. The same as above the grip 35 and the base 30 are firmly fixed to the handlebar 2 by tightening the bolt 37.

Figure 8:
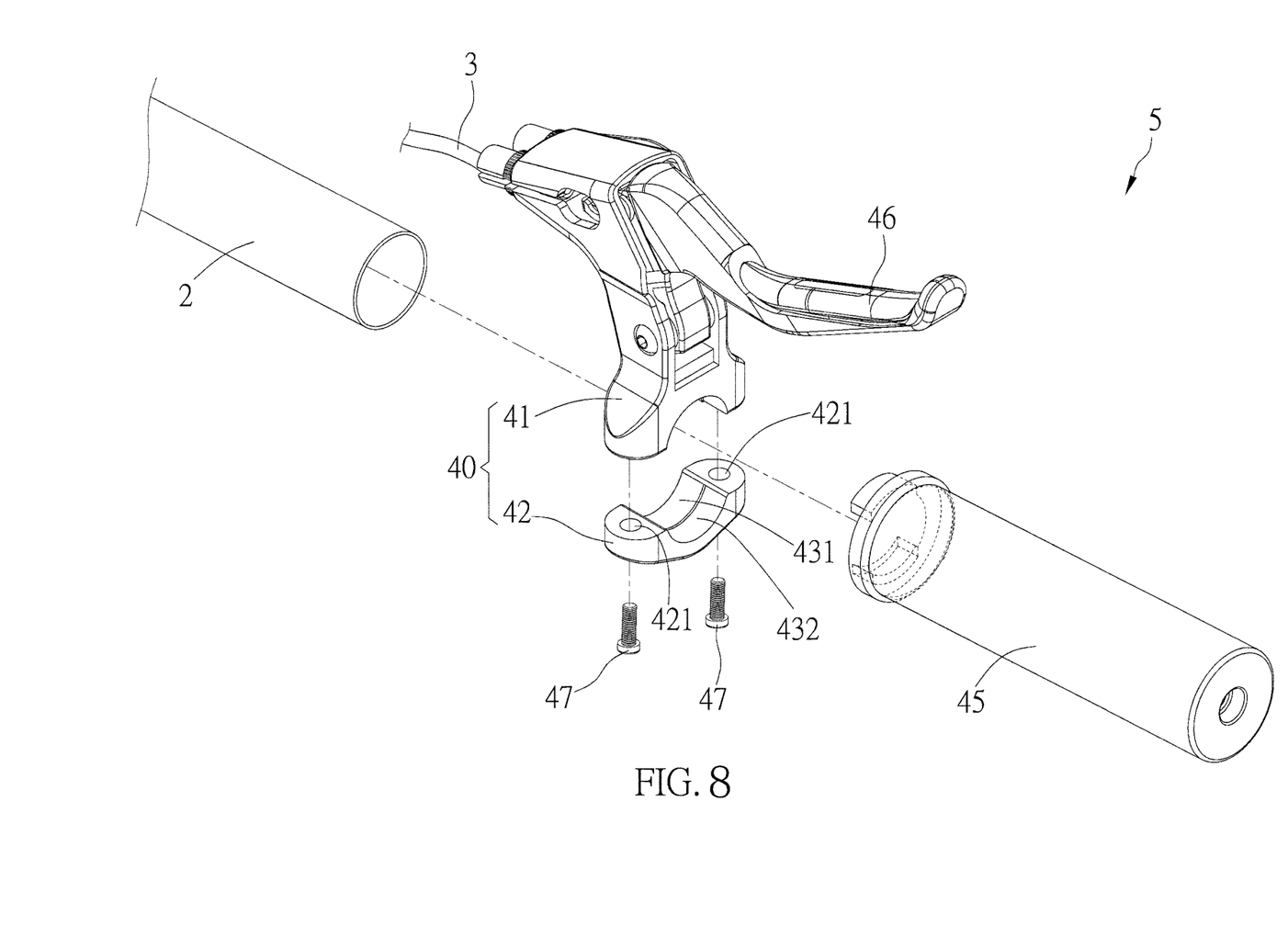
FIG. 8 is an exploded view of a third preferred embodiment of the present invention.
Figure 9:
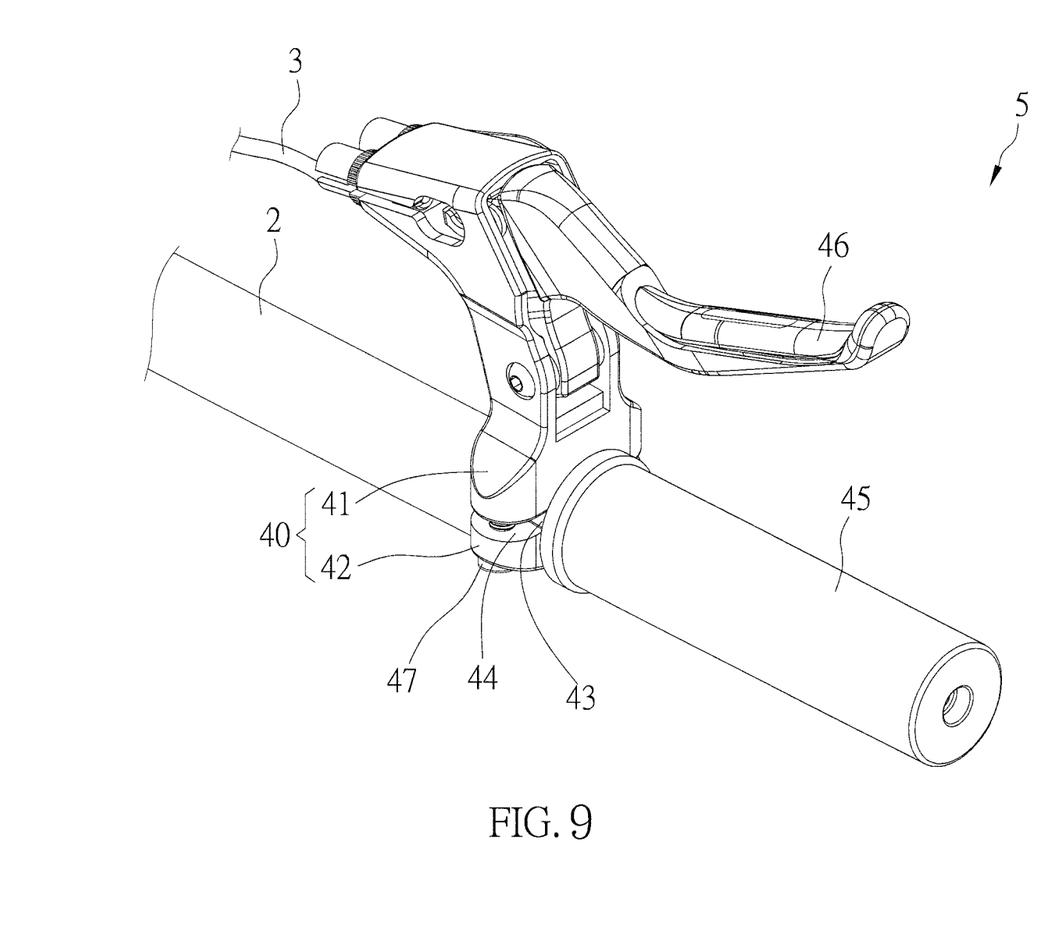
FIG. 9 is a perspective view of the third preferred embodiment of the present invention.

FIG. 8 and FIG. 9 show a control module 5 of the third preferred embodiment of the present invention, which is mounted on the handlebar 2 to control the brake module through the wire 3. The control module 5 has a base 40, a grip 45, a control bar 46, and two bolts 47 wherein the grip 45, the control bar 46, and the bolts 47 are the same as above. The base 40 has a body 41 and a pressing member 42. The pressing member 42 respectively has a bore 421 at opposite ends, and the body 41 has two threaded bores (not shown). The body 41 and the pressing member 42 are fixed together while the bolts 47 are inserted into the bore 421 of the pressing member 42 and screwed into the threaded bores of the body 41. The same as above, the body 41 and the pressing member 42 form a hole 43. The hole 43 has a first section 431 and a second section 432, and the second section 432 is bigger than the first section 431. The base 40 is fitted to the handlebar 2, and a sidewall of the first section 431 touches the handlebar 2. The grip 45 has a portion receive in the second section 432 of the base 40. The same as above the grip 45 and the base 40 are firmly fixed to the handlebar 2 by tightening the bolts 47.

The control module may be used to control a hydraulic brake also so that the control bar is connected to a hose, in which fluid flows to activate the brake.

Figure 10:
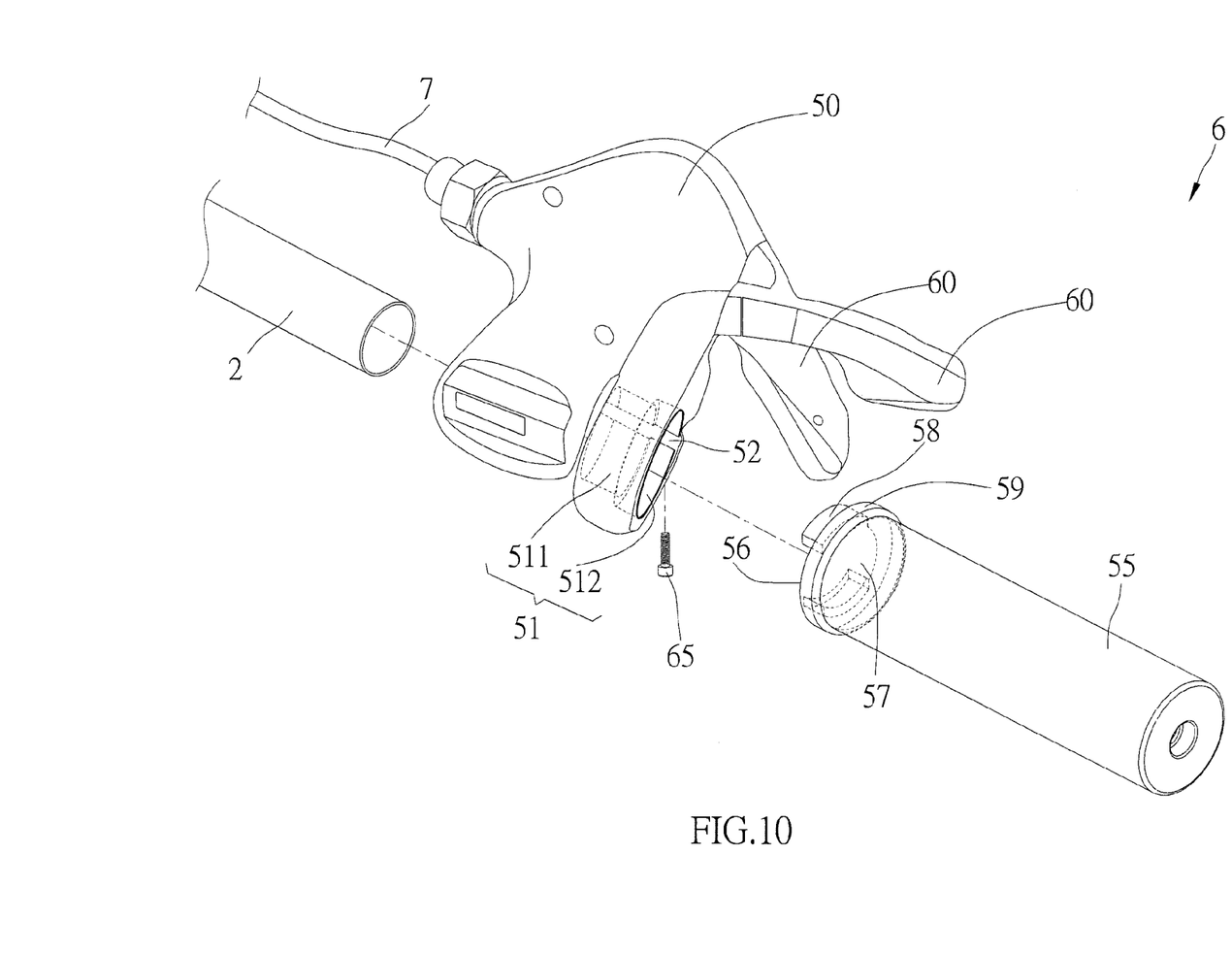
FIG. 10 is an exploded view of a fourth preferred embodiment of the present invention.
Figure 11:
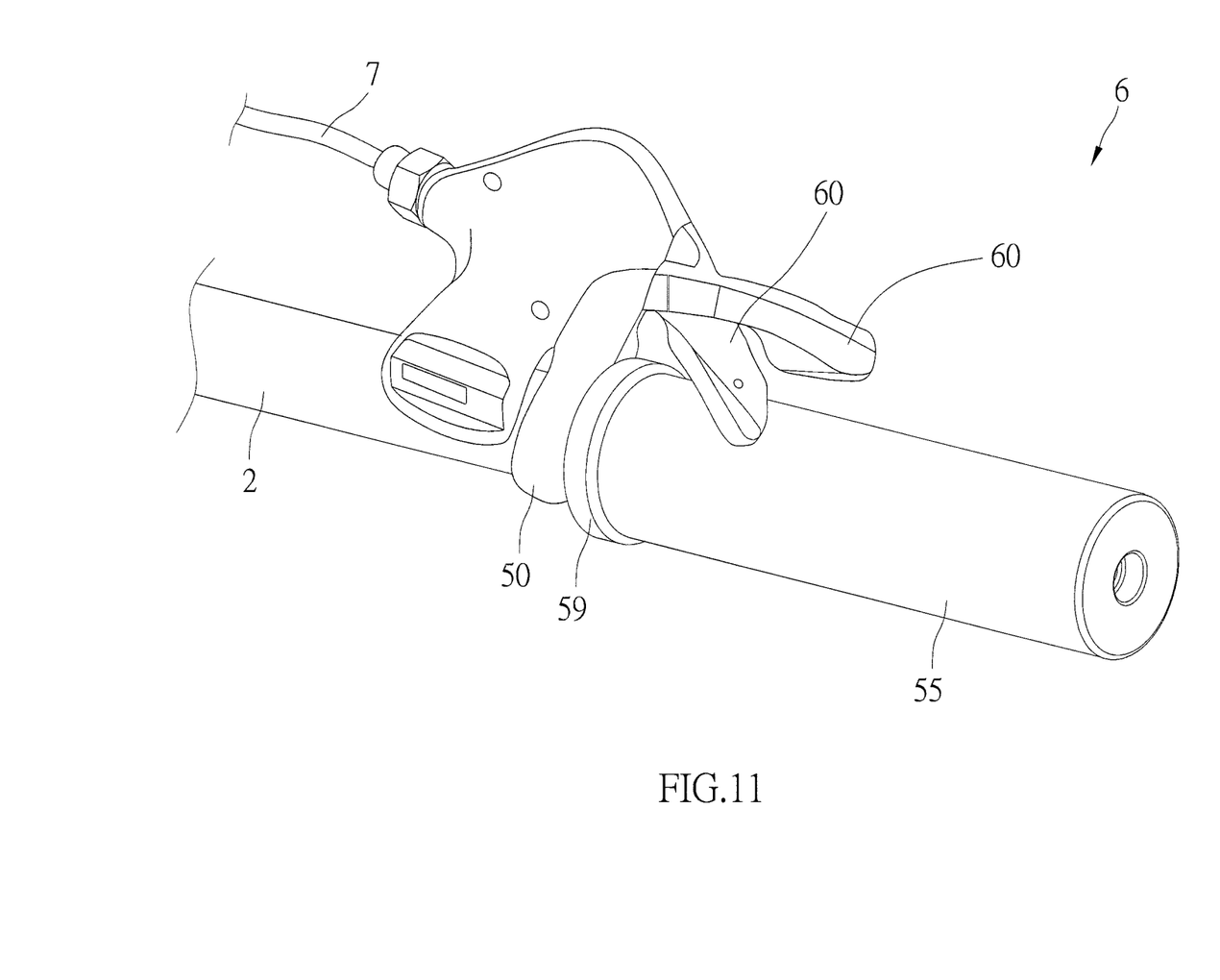
FIG. 11 is a perspective view of the fourth preferred embodiment of the present invention.

FIG. 10 and FIG. 11 show a control module 6 of the fourth preferred embodiment of the present invention, which is mounted on the handlebar 2 to control a derailleur module (not shown) through the wire 3. The control module 6 has a base 50, a grip 55, two control bars 60, and a bolt 65.

The base 50 has a hole 51 and a gap 52. The gap 52 is communicated with the hole 51. The hole 51 has a first section 511 and a second section 512, which is bigger than the first section 511. The base 50 is fitted to the handlebar 2, and a sidewall of the first section 511 touches the handlebar 2.

The grip 55 is fitted to the handlebar 2. The grip 55 has an opening 57 at an end 56 proximal to the base 50 and two protrusions 58 at opposite sides of the opening 57. The protrusions 58 are received in the second section 512 of the hole 51 of the base 50. The grip 55 further has a flange 59 surrounding the opening 57 to be against the base 50.

The control bars 60 respectively are pivoted on the base 50 to control the derailleur module (not shown) through the wire 3.

The bolt 65 is inserted into bores on the base 50. The same as above, the base 50 and the grip 55 are fixed to the handlebar 2 at the same time by tightening the bolt 65.

Figure 12:
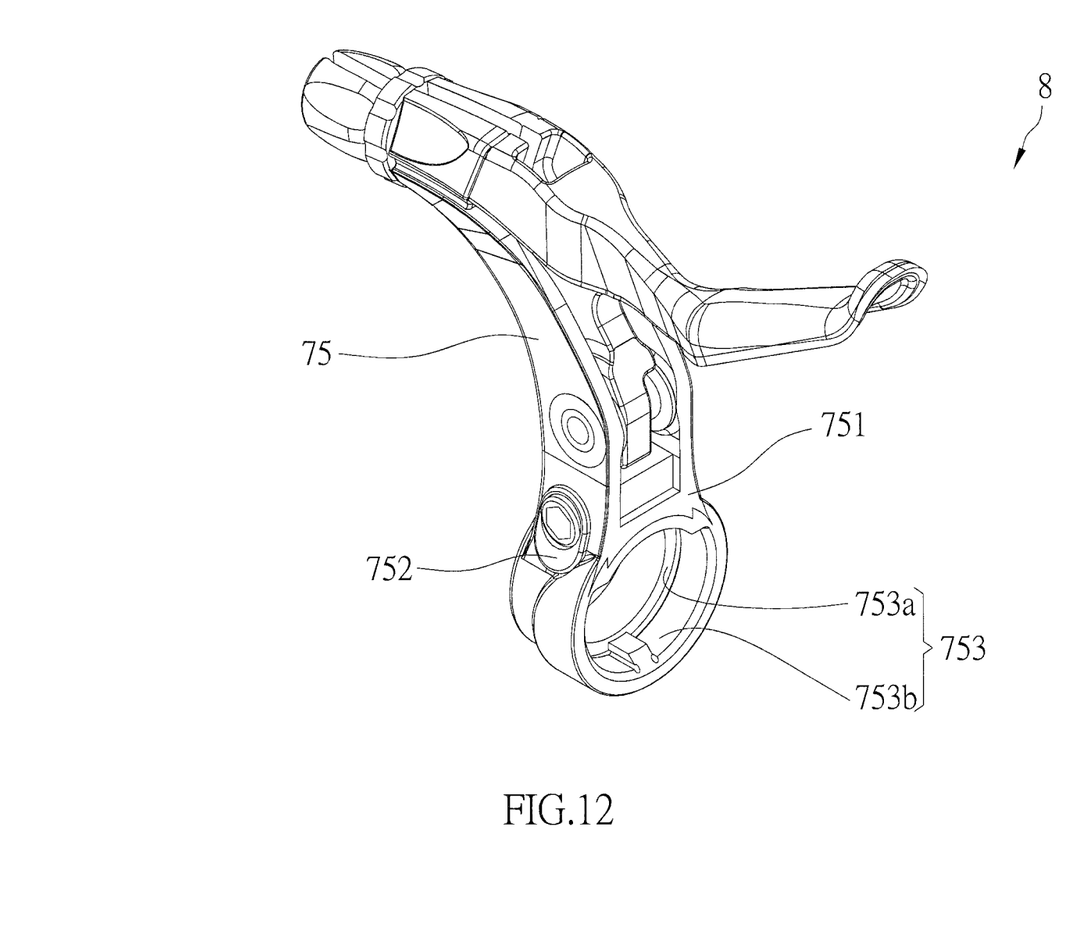
FIG. 12 is a perspective view of a fifth preferred embodiment of the present invention.
Figure 13:
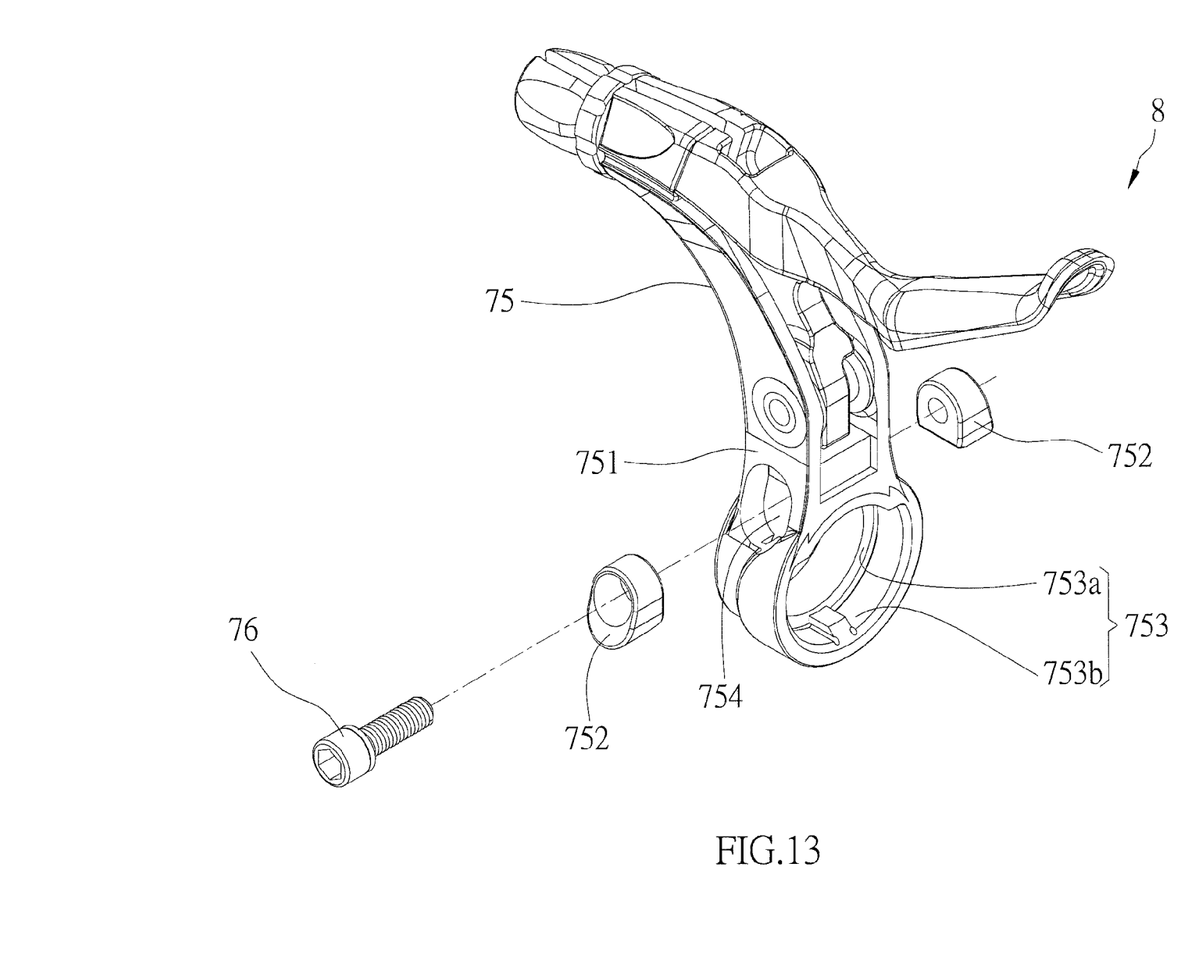
FIG. 13 is an exploded view of the fifth preferred embodiment of the present invention.

FIG. 12 and FIG. 13 show a control module 8 of the fifth preferred embodiment of the present invention, which is similar to the above embodiments, except that a base 75 includes a body 751 and two pressing members 752. The body 751 has a hole 753, and the hole 753 has a first section 753a and a second section 753b. The body 751 further has a through hole 754. The through hole 754 is above the hole 753 and is perpendicular to the hole 753. The through hole 754 is communicated with the hole 753 at the second section 753b. The pressing members 752 are received in the through hole 754, and a bolt 76 is inserted into one pressing member 752 and screwed into another pressing member 752.

Figure 14:
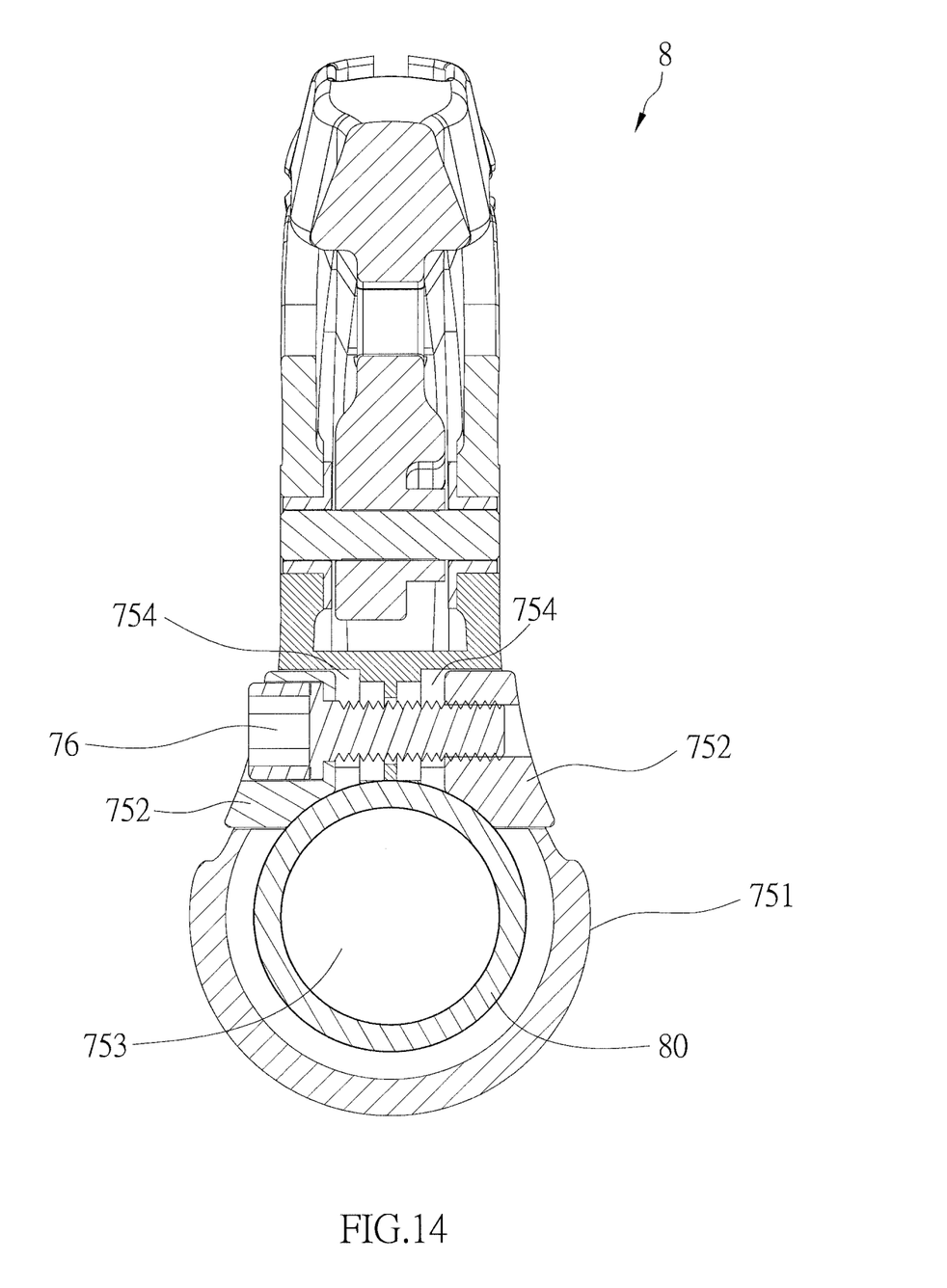
FIG. 14 is a sketch diagram, showing the body and the pressing member in interference fit to press the grip.

As shown in FIG. 14, except that the first section 753a is pressed on the handlebar (not shown) and the second section 753b is pressed on the grip 80, the pressing members 752 move inward and enter the hole 753 to press the grip 80 while the bolt 76 is tightened so that the grip 80 is firmly fixed to the body 751.

Figure 15:
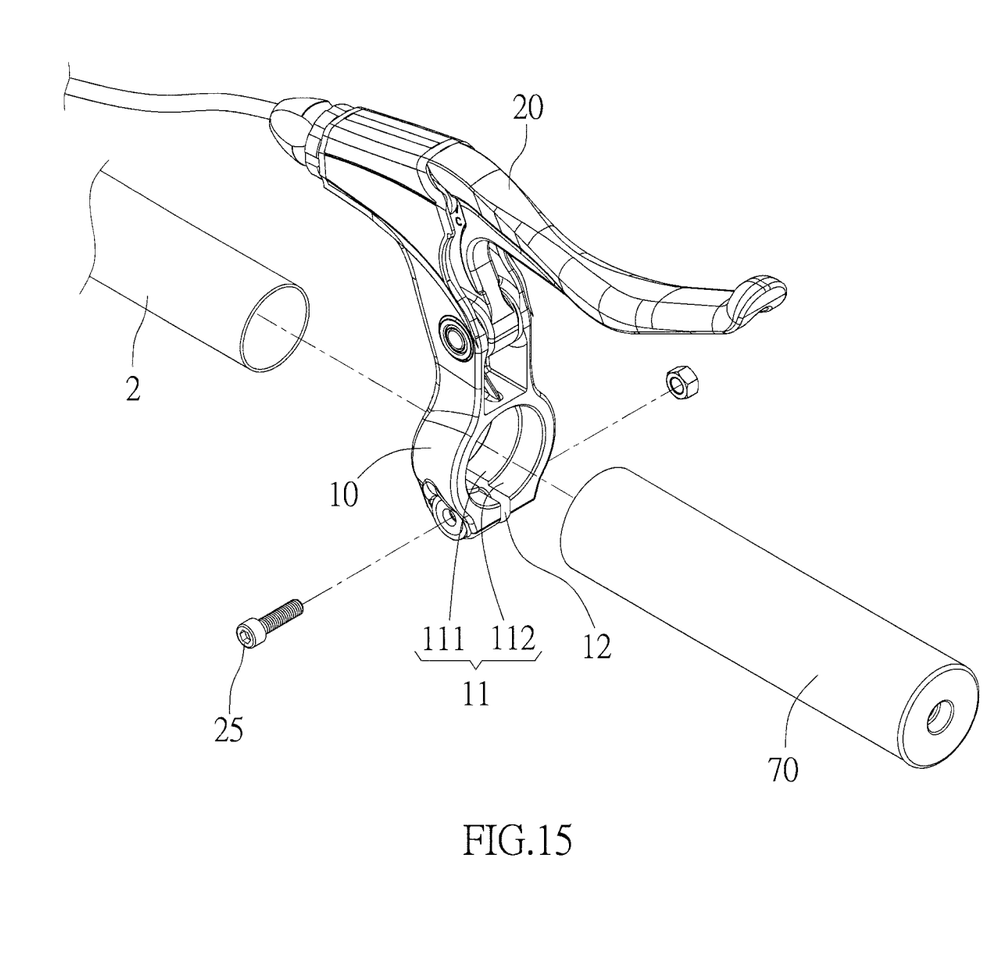
FIG. 15 and FIG. 16 show the present invention incorporated in the conventional grip.
Figure 16:
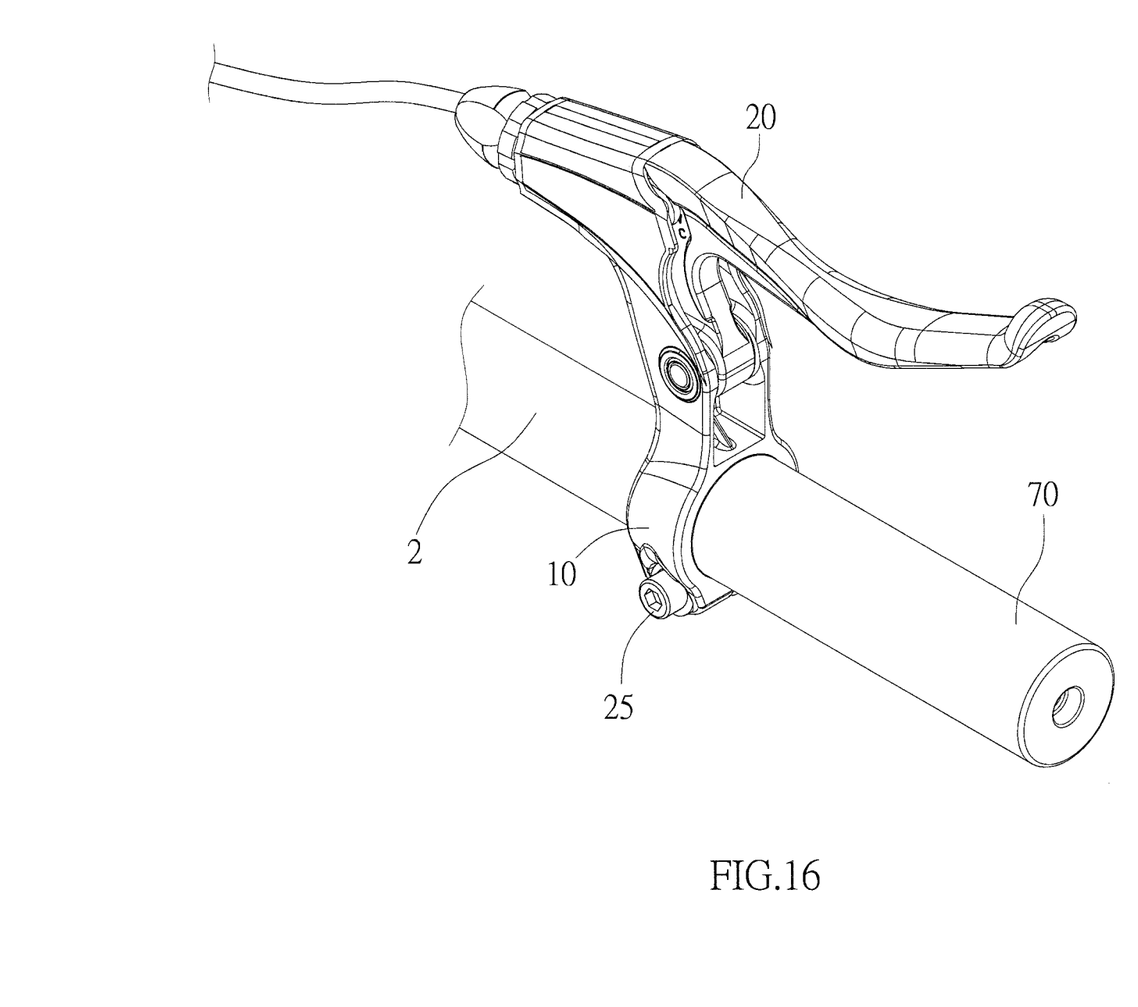

The conventional grip may be incorporated in the present invention. As shown in FIG. 15 and FIG. 16, the control module has the base 10, the control bar 20, the bolt 25, and a conventional grip 70 (without the protrusion), wherein the base 10, the control bar 20, and the bolt 25 are the same as the first preferred embodiment. The base 10 is fitted to the handlebar 2, and a sidewall of the first section 111 touches the handlebar 2. The conventional grip 70 has a portion received in the second section 112 of the hole 11 of the base 10. The same as above, the base 10 and the grip 70 are fixed to the handlebar 2 by tightening the bolt 25. Except for the first preferred embodiment, the conventional grip 70 may be incorporated in the base of the second, the third, the fourth, or the fifth preferred embodiment also.

The present invention provides an end of the grip to engage the base so that the grip still has a large area to be held by a rider. It will not interfere with operation of the bicycle when the rider holds the grip to provide the rider an easy and safe way to ride the bicycle.

The description above is a few preferred embodiments of the present invention, and the equivalence of the present invention is still in the scope of claim construction of the present invention.

What is claimed is:

1. A control module, which is mounted on a handlebar of a bicycle, comprising:
   a base having a hole, wherein the hole has a first section and a second section; a diameter of the second section is bigger than that of the first section; and the base is fitted to the handlebar whereby a sidewall encircling the first section touches the handlebar;
   a grip, which is fitted to the handlebar, having a portion received in the second section of the hole of the base, wherein the grip is able to rotate relative to the base;
   the grip has at least a protrusion at an end thereof; and the protrusion is received in the second section of the hole of the base;
   at least a control bar pivoted on the base;
   at least a bolt provided on the base, wherein the first section is on the handlebar and the second section is on the grip while the bolt is tightened;
   the base has a body and two pressing members; the body has the hole and two through holes; the through holes are communicated with the hole at the second section, and the through holes are aligned with each other; the pressing members are received in the through holes, and the bolt is inserted into the pressing members;
   each through hole has an encircled sidewall to touch the pressing member; and
   the body further includes a protrusion on a sidewall of the hole; and while the bolt is tightened, the pressing members enter the hole, and a distal end of the protrusion, which is on the sidewall of the hole of the body, and the pressing members press the grip.

2. The control module as defined in claim 1, wherein the grip has an opening at an end thereof and a flange surrounding the opening; and the flange leans against the base.

\* \* \* \* \*